United States Patent [19]
Gauthier et al.

[11] Patent Number: 6,027,195
[45] Date of Patent: Feb. 22, 2000

[54] SYSTEM AND METHOD FOR SYNCHRONIZING THE PIEZOELECTRIC CLOCK SOURCES OF A PLURALITY OF INK JET PRINTHEADS

[75] Inventors: Forrest P. Gauthier, Maineville; Dimitrije L. Jovic, Cincinnati, both of Ohio

[73] Assignee: Varis Corporation, Mason, Ohio

[21] Appl. No.: 08/745,699

[22] Filed: Nov. 12, 1996

[51] Int. Cl.⁷ .............................. B41J 29/38; B41J 2/02
[52] U.S. Cl. .................................. 347/5; 347/9; 347/10; 347/75
[58] Field of Search ............................ 347/5, 9, 10, 12, 347/73, 74, 75; 395/104, 114

[56] References Cited

U.S. PATENT DOCUMENTS

| | | |
|---|---|---|
| 4,547,786 | 10/1985 | Logan et al. . |
| 4,792,966 | 12/1988 | Ballweg .................................. 375/112 |
| 4,807,259 | 2/1989 | Yamanaka et al. ...................... 375/109 |
| 4,815,110 | 3/1989 | Benson et al. ........................... 375/107 |
| 4,845,709 | 7/1989 | Matsumoto et al. ...................... 370/86 |
| 4,866,704 | 9/1989 | Bergman .................................. 370/85 |
| 4,956,648 | 9/1990 | Hongo . |
| 5,132,710 | 7/1992 | Ejiri et al. . |
| 5,206,857 | 4/1993 | Farleigh ................................... 370/85 |
| 5,245,355 | 9/1993 | Morton ................................ 347/131 X |
| 5,278,582 | 1/1994 | Hongo . |
| 5,408,590 | 4/1995 | Dvorzsak ................................ 347/5 X |
| 5,428,375 | 6/1995 | Simon et al. .............................. 347/12 |
| 5,541,628 | 7/1996 | Chang et al. .............................. 347/10 |
| 5,596,416 | 1/1997 | Barry et al. .............................. 358/296 |
| 5,606,349 | 2/1997 | Droit et al. .............................. 347/5 X |
| 5,650,806 | 7/1997 | Denne .................................. 347/68 X |

OTHER PUBLICATIONS

"HOTLink User's Guide", Cypress Semiconductor Corporation, pp. 1–28, Jun. 1995.

*Primary Examiner*—N. Le
*Assistant Examiner*—Thinh Nguyen
*Attorney, Agent, or Firm*—Thompson Hine & Flory LLP

[57] ABSTRACT

The method for synchronizing the plurality of piezoelectric crystals on a corresponding plurality of ink jet printheads comprises the steps of: (a) coupling the plurality of printheads together in a daisy-chain configuration, (b) embedding a first clock signal in data; (c) transmitting the data to the printheads on the daisy-chain; (d) each of the printheads receiving the data; (e) each of the printheads deriving a second clock signal from the data received, which is directly proportional to the first clock signal; and (f) each of the printheads driving its corresponding piezoelectric crystal with the second clock signal. Accordingly, all of the piezoelectric crystal clock sources will be synchronized in frequency with each other, eliminating beat frequency drift errors between the printheads. Preferably, the method also includes the steps of: (i) determining the time it will take for the data to propagate to each of the printheads; and (ii) adjusting the phase of the second clock signal to reflect the propagation measurement. Accordingly, all of the piezoelectric crystal clock sources will also be synchronized in phase as well as frequency to each other.

30 Claims, 4 Drawing Sheets

SYSTEM AND METHOD FOR SYNCHRONIZING THE PIEZOELECTRIC CLOCK SOURCES OF A PLURALITY OF INK JET PRINTHEADS

BACKGROUND OF THE INVENTION

The present invention relates to digital and print-on-demand printing systems; and more particularly, to a high-speed printer controller system which is configured to control a multitude of ink jet printheads simultaneously, and is configured to synchronize all of the piezoelectric crystals located within the ink jet printheads.

Ink jet printing is a non-impact print method which is based upon controlling the behavior of a fluid ink stream using pressure, ultrasonic vibration and electrostatic forces. A typical ink jet printhead will include a multitude of nozzle orifices, aligned in an array, for emitting a corresponding multitude of fluid ink streams, commonly referred to as an array of ink. Pressure is created by a push rod to force the ink from the ink chamber and through an array of nozzle orifices.

A high frequency ultrasonic vibration (referred to as a "modulation signal") is applied to the push rod and, in turn, to the ink stored in an ink chamber within the ink jet printhead, to establish a standing wave pattern within the ink. To create the modulation signal, the typical ink jet print head will utilize an internal clock source which is sent to a piezoelectric crystal, typically mounted within the push rod assembly. The piezoelectric crystal will thus vibrate at the frequency of the clock source. The vibrational waves will conduct into the ink chamber, causing the standing wave pattern within the ink. This standing wave pattern in the ink causes the ink to break into individual droplets when the ink emerges from the nozzle orifices. The resulting array of ink droplet streams is directed (typically downward) towards the substrate to receive the printed image.

A multitude of electrodes are positioned adjacent to each of the ink droplet streams, near the nozzle orifices. The electrodes, controlled by the ink jet printhead, apply a voltage to the droplets which are not intended to contact the substrate. Below the electrodes, the droplet streams pass through a high voltage field which forces the charged droplets to be deflected into a gutter and which allows the uncharged droplets to pass through the field and onto the substrate, thus forming the printed image.

The nozzle orifices are typically arranged on the ink jet printhead in a row, where each nozzle orifice corresponds to one column of image pixels on the final printed image. The printed image is formed by emitting successive horizontal lines of the ink droplets (referred to as "strokes") applied to the continuously moving substrate (moving in the vertical direction). Each stroke forms one row of pixels on the final printed image. The electrodes are controlled for each stroke by the ink jet printhead in accordance with the bitmap data sent to the print head by the raster printer controller.

In low-speed printing operations, where the substrate is moved at low speeds under the ink jet printheads, the width of the row of nozzle orifices is not a concern. However, in high-speed printing operations, where the substrate is moved at high speeds under the ink jet printheads (i.e., to print 1000 feet per minute), the size of the row of nozzle orifices becomes a real concern because of the time it takes for the vibrational waves in the chamber to travel from the push rod to the far ends of the printhead. Accordingly, to be able to print detailed, full size images in high speed ink jet print operations, it is necessary to utilize a plurality of the ink jet print heads, where each print head is responsible to print one vertical portion or "swath" of the image. One "swath" of an image corresponds to the number of vertical columns of pixels that one ink jet printhead will be able to print. Typically, the width of each swath can range from approximately 20 to 1024 pixels (i.e., the swath would comprise 20 to 1024 columns of pixels), however the range can vary depending upon the application.

Because the physical width of the ink jet printhead exceeds the width of the swath printed by the ink jet printhead, the multiple ink jet printheads cannot be aligned side by side with respect to each other without experiencing noticeable gaps between the swaths. Therefore, to get a continuous image across the width of the entire printed page, with no noticeable gaps between the swaths, it is necessary to stagger the ink jet print heads vertically with respect to the substrate such that they do not interfere with each other. It is also necessary to simultaneously control the multiple ink jet printheads such that their respective swaths are vertically and horizontally aligned with respect to the substrate. The process of vertically and horizontally aligning these swaths on the substrate to form one image is commonly referred to as "stitching".

Stitching the multiple ink jet swaths down to the pixel level in order to obtain sub pixel resolution is extremely challenging. Mechanical alignment is the most common method of aligning the printheads to achieve stitching of the swaths. Utilizing micrometer adjustment and measurement devices on the x and y axes, the position of the printheads can be adjusted to approach sub pixel resolution. However, such alignment is only useful for a particular ink viscosity, temperature of the environment, humidity of the environment and print speed. Once any one of these variables changes, i.e., the viscosity of the ink changes, the pixel resolution will again become misaligned. Furthermore, even if the printheads are perfectly aligned, the piezoelectric crystals in each printhead will be driven at a slightly different frequency, thus causing beat frequency drift errors between the printheads which eventually leads to very visible alignment errors between the pixels of the different swaths. Electronic alignment methods and mechanisms, while more flexible than mechanical alignment systems, also cannot achieve sub pixel resolution because of the piezo beat frequency drift errors, which will eventually cause drift between the printheads, independent of the mechanical and/or electronic methods and systems used for stitching the swaths together.

Accordingly, a need exists for a system and method for simultaneously controlling the plurality of staggered ink jet printheads such that stitching between the swaths generated by the ink jet printheads can be easily accomplished electronically, regardless of the ink viscosity, print speed, temperature and humidity. Furthermore, a need exists for a system and method for synchronizing the piezo clock sources on each of the ink jet printheads to each other such that the stitching can be accomplished down to sub pixel levels without experiencing beat frequency drift errors between the pixel swaths.

SUMMARY OF THE INVENTION

The present invention provides a system and method for simultaneously controlling a multitude of continuous-flow ink jet printheads which facilitates the electronic stitching between the ink jet printheads; and furthermore, the present invention provides a system and method for synchronizing the piezo clock sources on each of the ink jet printheads to each other such that the electronic stitching can be accomplished down to the pixel levels.

The method for synchronizing the plurality of piezoelectric crystals on a corresponding plurality of ink jet printheads comprises the steps of: (a) coupling the plurality of printheads together with a printer controller, (b) embedding a first clock signal in data; (c) transmitting the data to the printheads; (d) each of the printheads receiving the data; (e) each of the printheads deriving a second clock signal from the data received, which is directly proportional to the first clock signal; and (f) each of the printheads driving its corresponding piezoelectric crystal with the second clock signal. Accordingly, all of the piezoelectric crystal clock sources will be synchronized in frequency with each other, eliminating beat frequency drift errors between the printheads.

Preferably, the printheads and controller are connected together in a daisy-chain configuration and the method also includes the steps of: (i) determining the time it will take for the data to propagate to each of the printheads; and (ii) adjusting the phase of the second clock signal to reflect the propagation measurement. Accordingly, all of the piezoelectric crystal clock sources will also be synchronized in phase as well as frequency to each other.

The above method is accomplished by operating a plurality of ink jet printheads with a high-speed raster printer controller. Each ink jet printhead includes a customized communication circuit, which in the preferred embodiment is a separate circuit board, hereinafter referred to as a "target adapter board" ("TAB"). The TAB provides a direct interface between the ink jet printhead electronics and the controller. The controller and each TAB includes a serial data input port and a serial data output port. The controller is attached to the plurality of TABs in a daisy-chained ring configuration, such that the controller will transmit commands and data to the first TAB on the daisy-chain, and the commands and data will flow in the same direction along the daisy-chain to the rest of the TABs, and will eventually flow back to the controller. Furthermore, the controller is adapted to transmit rasterized bitmap image data to the TABs, and in turn to the ink jet printheads, in an on-demand manner. The daisy-chained serial communication ring configuration of the controller and the plurality of TABs is hereinafter referred to as "the ring."

The ring configuration allows all of the TABs to see all of the data all of the time. This also provides a clean mechanism for the raster printer controller to receive status from all of the ink jet printheads with minimal cabling requirements. Furthermore, use of fiber optic links in the ring provides high bandwidth data transfer capabilities, excellent electrical isolation and immunity from excessive high voltages associated with ink jet printhead electronics.

The raster printer controller has a multiplexed command/data-stream protocol structure at its fiber optic interface in which the controller transmits a command followed by the associated data. The controller initiates all commands, and manages the allocation of fiber optic band-width to receive all ink jet printhead status. Each TAB is adapted to listen for commands addressed to it, and responds appropriately; and further, the TAB never responds unless commanded by the controller. Nevertheless, each TAB must retransmit the entire command/data-stream it receives on its fiber optic input port back to its fiber optic output port, and in turn, to the next TAB on the ring. This allows all of the TABs to see all of the controller commands and data, all of the time.

Each TAB includes a fiber optic receiver/decoder, a fiber optic encoder/transmitter, a standard discrete output bus, a standard discrete input bus, an ink jet printhead instruction register, an ink jet printhead status register, a bitmap data memory storage, a stroke rate counter and associated stroke rate count preload register, a high-speed fiber optic message processing circuit, and an on-board CPU. Therefore, each TAB essentially includes all the necessary ink jet stroke machine components.

The CPU and message processing circuit are adapted to manage the incoming and outgoing commands, to manage the TAB's hardware, and to provide an interface to the ink jet printhead electronics. The message processing circuit monitors the fiber optic input and executes the commands transmitted by the raster printer controller if the commands are addressed to it. The message processing circuit also continuously retransmits the commands/data-stream back to the fiber optic encoder/transmitter, supports the general purpose discrete output bus and instruction register in response to the commands, reads the general purpose discrete input bus and ink jet printhead status register which can be incorporated into messages sent directly to the raster printer controller as status, and also manages the data update of the bitmap data memory storage when commanded by the raster printer controller.

The raster printer controller utilizes a multiplexed command/data protocol scheme to control the TABs which deliver stroke data to their corresponding ink jet printheads on every piezo cycle. The raster printer controller's multiplexed command/data protocol scheme allows the raster printer controller to transmit bitmap data to the ink jet printhead in any order and at any time, thus providing print-on-demand capabilities to the ink jet printheads; allows the controller to embed a "Print Trigger" command within the command/data stream at any time thus providing real-time print trigger generation to the ink jet printheads; and allows the controller to embed a stroke rate signal within the command/data stream indicative of the web velocity and/or acceleration.

The command/data stream is transmitted over the fiber optic ring utilizing a self-clocking data transmission code such as 8B/10B code. The fiber optic encoder on the raster printer controller embeds a clock signal into the command/data stream by encoding the raw data. This allows the fiber optic decoders on each of the TAB boards to extract the embedded digital clock signal from the encoded data and to decode the command/data stream back into its raw data.

The extracted digital clock is used by each TAB to generate the piezoelectric clock source for driving the piezoelectric crystal on its corresponding ink jet printhead. Because each extracted clock signal will have the exact frequency (directly proportional to the clock signal embedded by the raster printer controller), each piezo clock source generated from the external clock source will also have the exact frequency.

Preferably, the piezoelectric clock source is generated as follows: The extracted digital clock drives a free running counter whose count output is sent to a memory device which acts as a lookup table. The lookup table includes a voltage amplitude value for every count input. The voltage amplitude values in the lookup table each correspond to a particular voltage amplitude level in one period of the piezoelectric clock source's sine wave. Thus, the memory device will output the particular voltage amplitude value from the lookup table, depending upon the count input received from the counter; therefore, for each cycle through the counter, the voltage amplitude values corresponding to one period of the piezoelectric clock source's sine wave will be output from the lookup table. The voltage amplitude value is sent to a digital-to-analog converter, the amplified output of this digital-to-analog converter is the analog clock source for the piezoelectric crystal.

To reset the counters, the raster printer controller will broadcast a PIEZO CLOCK RESET command to the first TAB on the ring. The first TAB will receive this command and restart its counter to start generating its piezoelectric clock source. As discussed above, the first TAB will also pass this command to the next TAB on the ring; which will restart its counter in response to the command and will in turn pass the command to the next TAB on the ring. This is repeated until the command is passed back to the raster printer controller.

Because it will take time for the a PIEZO CLOCK RESET command to propagate to each TAB on the fiber optic ring, the present invention includes a method to assure that all the piezoelectric clock sources are synchronized in phase as well as frequency. Thus, each counter includes a preload input coupled to a phase-shift preload register. Each phase-shift preload register will be initialized by the raster printer controller during the boot-up process to a count pre-set value which corresponds to the time it takes for the PIEZO CLOCK RESET command to reach the particular TAB. Thus, even though each piezoelectric clock source will be started at progressively different instances, each phase-shift preload register is set to a particular count value to assure that the output voltage level of the piezoelectric clock source of a given TAB upon receiving the PIEZO CLOCK RESET command is at the same voltage amplitude levels of all piezoelectric clock sources started prior to the present one.

Each piezoelectric clock source is therefore locked in both phase and frequency to each other.

Accordingly, it is an object of the present invention to provide an ink jet print system with multiple ink jet printheads which can dispatch rasterized bitmap data to the ink jet printheads in an on-demand manner; which can transmit print trigger and stroke rate information to the ink jet print heads at any time; which synchronizes the piezoelectric clock sources for each ink jet printhead to a single clock source; which synchronizes the piezoelectric clock sources for each ink jet printhead in both phase and frequency; and which provides a system which facilitates electronic stitching of the ink jet printheads down to the pixel level. These and other objects will be apparent from the following description, the accompanying drawings and the appended claims.

DETAILED DESCRIPTION

Figure 1:
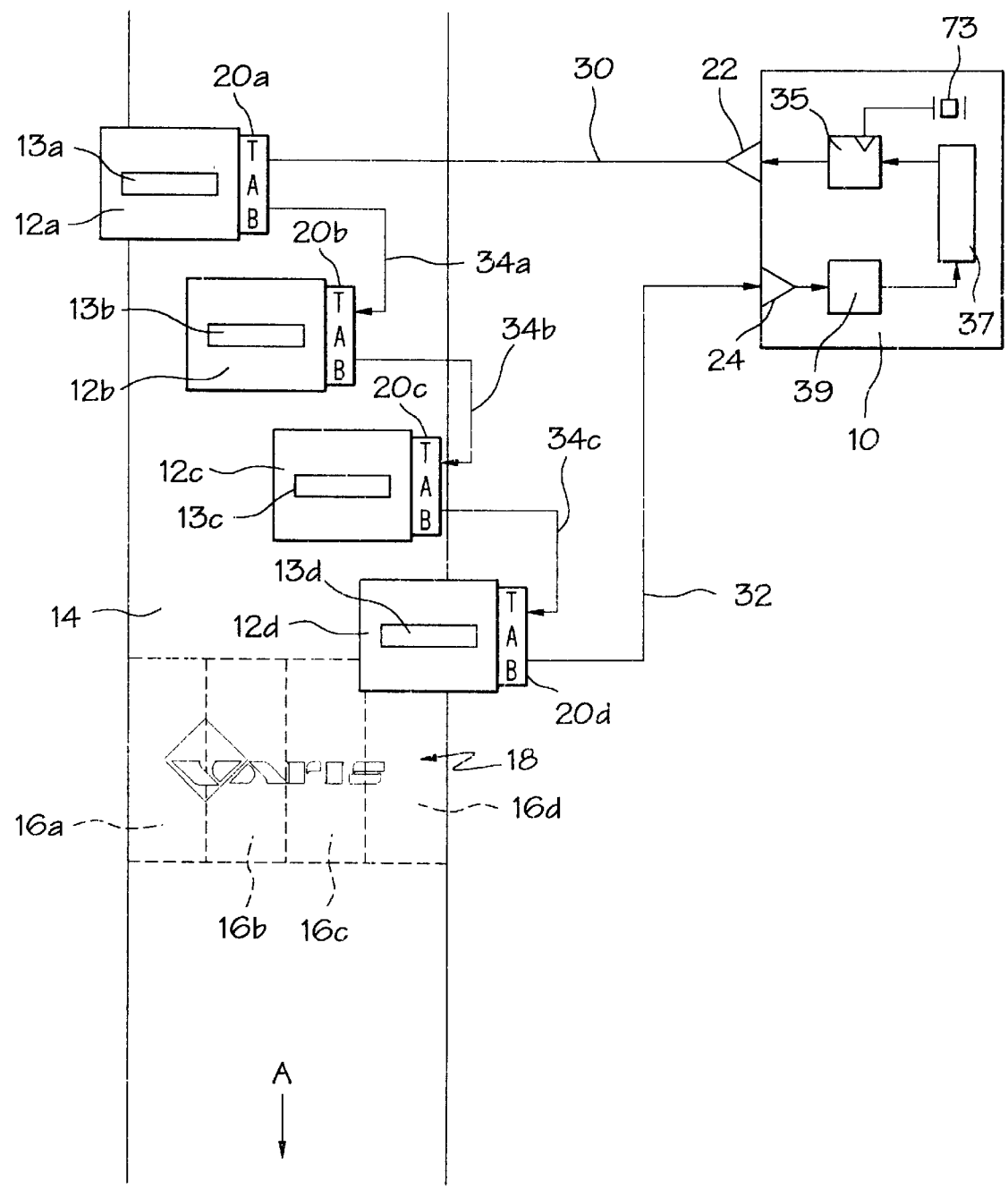
FIG. 1 is a block diagram of the present invention, depicting a plurality of ink jet print heads arranged in a staggered array to print upon a web and controlled by a single printer controller, the ink jet printheads and the controller being coupled in a daisy-chain ring configuration.

As shown in FIG. 1, a high speed raster printer controller 10 is used to simultaneously drive a plurality of ink jet printheads 12a–12d each of which have a nozzle array 13a–13d for ejecting strokes of ink to a substrate or web 14 moving in a vertical direction indicated by arrow A. The ink jet printheads 12a–12d are positioned in a staggered formation along the web 14 and each ink jet printhead is controlled by the controller 10 to transfer a corresponding swath 16a–16f of an image 18 to the web 14.

The high speed raster printer controller 10 is preferably a multi-processor system for interpreting and processing an image or images defined by a page description language and for dispatching rasterized bitmap data generated by the processing of the page description language as described, for example, in U.S. patent application Ser. No. 08/558,007, filed Nov. 13, 1995. Each ink jet printhead 12a–12d is coupled to one of a plurality of ink jet printhead communication circuits, which preferably reside on individual circuit boards, hereinafter referred to as "target adapter boards" ("TAB") 20a–20d. For the purposes of this disclosure, when it is disclosed that one component is "coupled" to another component, it will mean that the one component is linked to the other component by any data link such as an electronic data link (wires or circuits), a fiber optic data link, an RF (radio frequency) data link, infrared data link, an electromagnetic data link, or any other type of data link known to one of ordinary skill in the art.

Each TAB 20a–20d provides an interface between the raster printer controller 10 and the respective plurality of ink jet printheads 12a–12d. Preferably each TAB includes a universal controller interface section to provide a means to communicate with the raster printer controller 10; and a customized print engine interface section which provides a direct interface between the ink jet printhead electronics and the raster printer controller 10.

The raster printer controller 10 includes a serial data output port 22 and a serial data input port 24. The output port 22 is preferably a fiber optic transmitter and the input port 24 is preferably a fiber optic receiver. Each of the TABs 20a14 20d also include a serial data input port 26 and a serial data output port 28 (see FIG. 2); where the input port 20 is preferably a fiber optic receiver and the output port is preferably a fiber optic transmitter. Therefore, both the raster printer controller 10 and the plurality of TABs 20a–20d each have duplex communications via fiber optics.

As is further shown in FIG. 1, the raster printer controller 10 is coupled to the plurality of TABs 20a–20d in a daisy-chain configuration; and furthermore, the last TAB 20d on the daisy-chain is coupled again to the raster printer controller to form a daisy-chain "ring". The raster printer controller 10 transmits a command/data stream to the first TAB 20a on the ring over a serial data link, which is preferably a fiber optic link 30; the last TAB 20d on the ring transmits command/data stream back to the raster printer controller 10 over a serial data link, which is preferably a fiber optic link 32; and each of the TABs 20a–20c transmit command/data stream to the next TAB on the ring, over serial data links, which are preferably fiber optic links 34a–34c. The data output port 22 of the raster printer controller 10 transmits coded data serially over the fiber optic link 30. The data is encoded from raw digital data by an encoder device 35. The raw digital data is passed over a parallel data line to the encoder device 35 from the control circuitry 37 of the raster printer controller. The data input port 24 receives the coded data back from the fiber optic link 32. This data is then decoded back into raw digital data by a decoder device 39. The raw digital data is then passed on to the control circuitry 37 of the raster printer controller in parallel form. The fiber optic links 30, 32, 34a–34c provide substantial electrical isolation and immunity from excessive high voltages associated with print engine electronics and the fiber optic links are scalable, i.e., their data rates can be easily slowed down if desired.

It should be apparent to one of ordinary skill in the art, that while fiber optic links are preferred for the present embodiment of the invention, it is within the scope of the invention to utilize any other type of serial data link capable of performing applications described herein. For example, the fiber optic links could be replaced with coax or twisted pair links.

Figure 4:
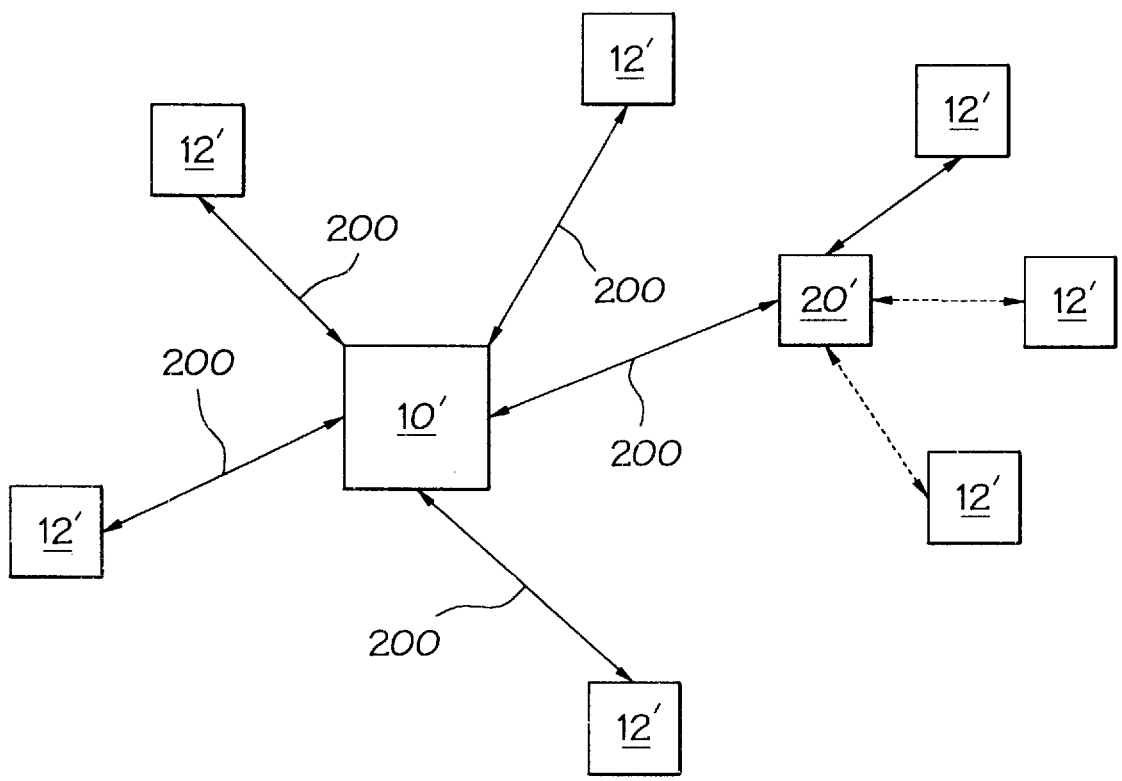
FIG. 4 is a schematic block diagram of an alternate arrangement of the printer controllers and ink jet printheads.

Furthermore, while the above daisy-chain ring configuration is preferred, it is within the scope of the invention to couple the controller 10 to the plurality of TABs 20a–d in a configuration (daisy-chain or otherwise) which is not configured as a ring. For example, as shown in FIG. 4, it is within the scope of the invention to couple the printer controller 10' to the plurality of ink jet printheads 12' in a "star" or "spoked wheel" configuration where the controller 10' will be at the "hub" and is coupled to each of the ink jet printheads 12' separately with individual data links 200. As is also shown in FIG. 4, it is also within the scope of the invention to utilize printhead communication circuits 20' to interface between the controller 10' and one or a plurality of printheads 12' in the "star" configuration.

The preferred daisy-chained serial configuration of the raster printer controller and plurality of TABs is hereinafter referred to as "the ring."

Each TAB is configured to transmit the entire command/data stream received on its input port 26 back to its output port 28. Accordingly the raster printer controller 10 will transmit the command/data stream to the first TAB 20a on the ring and the command/data stream will flow in the same direction along the daisy-chain to the rest of the TABs 20b–20d, and eventually will flow from the last TAB 20d on the ring back to the raster printer controller 10. This configuration allows all the TABs to see all the command/data stream all of the time.

Figure 2:
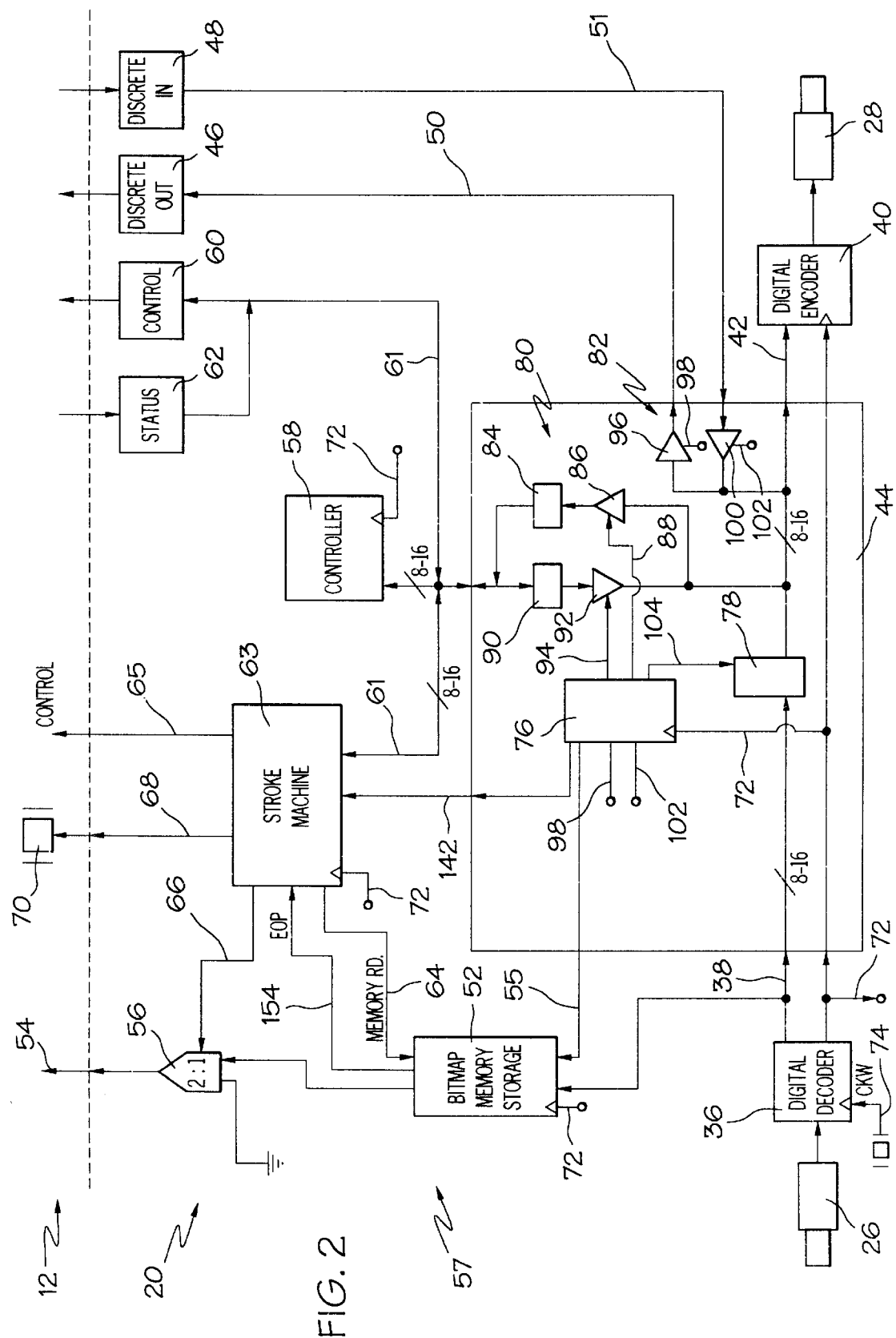
FIG. 2 is a schematic block diagram of a ink jet printhead communication device for use with the present invention.

As shown in FIG. 2, each TAB 20 includes a digital decoder 36 for decoding the data stream received by the fiber optic receiver 26 into raw digital input data on the input data bus 38, and a digital encoder 40 for transforming the raw digital output data on the output data bus 42 into an encoded data stream to be transmitted by the fiber optic transmitter 28. Also included on each TAB is a high-speed message processing circuit 44, coupled between the decoder 36 and encoder 40. The high-speed message processing circuit 44 is designed to monitor the digital input data on the input data bus 38 and to execute the commands embedded in the command/data stream when the embedded TAB address field matches the TAB's internal address. The high speed message processing circuit 44 also continuously retransmits this digital input data to its fiber optic encoder 40 as digital output data on the output data bus 42, which is in turn transmitted to the next TAB on the ring (or back to the raster printer controller if the present TAB is the last TAB on the ring) by the fiber optic transmitter 28.

Preferably, the high-speed message processing circuit 44 is a non-intelligent device, that is, it is a "hardware" device whose internal functions are not directed by a software program. Therefore the high-speed message processing circuit is very fast and is able to handle the bandwidth requirements for the multiplexed command/data protocol structure described below. Furthermore, the high-speed message processing circuit 44 is not as susceptible to the errors and failures which may commonly occur in software controlled devices. The high-speed message processing circuit 44 may be fabricated from standard TTL devices, CMOS devices, 7400 series logic, or incorporated into single or multiple chip implementations such as programmable logic arrays (PALs), field programmable gate arrays (FPGAs), application specific integrated circuits (ASICs) or any hardware description language (HDL) based device; and in a preferred embodiment, the high-speed message processing circuit 44 is an ASIC device.

The high-speed message processing circuit 44 is coupled to a discrete output buffer 46 and a discrete input buffer 48 via a data busses 50,51, respectively. In executing commands transmitted by the raster printer controller, the high-speed message processing circuit 44 can set or reset lines on the discrete output buffer 46 and can report back to the raster printer controller messages pertaining to the status of lines on the discrete input buffer 48. Such output discretes can include, for example, "print on-line," "printer reset," and "reset communications." Such input discretes can include, for example, "engine error." Thus, the discrete buffers provide a mechanism for handling general purpose I/O requirements of an ink jet printhead.

The TAB 14 also includes a bitmap data transfer circuit 57 which includes a bitmap data memory storage buffer 52 for interfacing directly to the corresponding ink jet printhead's video data input port 54. Therefore, the message processing circuit 44 is also designed to update the bitmap data memory storage buffer 52 when commanded by the raster printer controller 10. This bitmap data memory storage buffer, in the preferred embodiment, is a FIFO buffer; however, the bitmap data memory storage buffer 52 may also be video memory, a single byte of memory (i.e., a register), a dram array, or any other type of memory device as required by the design of the ink jet printhead interface. Therefore, the message processing circuit will update the bitmap memory storage buffer 52 by activating a "FIFO memory write" signal 55 coupled to the memory storage buffer. Preferably, the transfer circuit 57 also includes a multiplexor device 56 coupled between the ink jet printhead's video data input port 54 and the bitmap data memory storage buffer 52 for injecting NULL data between the vertical swaths of bitmap data.

The TAB includes an optional on-board CPU 58 which is used to manage higher level tasks as warranted by some types of ink jet printheads; a control port 60 controlled by the message processing circuit 44 or the on-board CPU 58, which can be used as part of the ink jet printhead interface to transmit ink jet printhead instructions (otherwise known as "ink jet printhead commands") and instruction parameters (otherwise known as "ink jet printhead command parameters") to the ink jet printhead; and an ink jet printhead status buffer 62 monitored by the message processing circuit 44 or the on-board CPU 58, which can be used to access ink jet printhead status information from the ink jet printhead. The CPU 58, the control port 60 and the status port 62 are coupled to each other by a bidirectional data bus 61.

The TAB also includes a Stroke Machine 63, coupled to the bidirectional data bus 61, for determining when to transfer a scanline ("stroke") of the bitmap data from the memory storage buffer 52 to the ink jet printhead's video data input port 54. This is accomplished by the activation of a "FIFO memory read" signal 64 by the Stroke Machine 63. The stroke machine 63 provides a video data control signal 65 to the ink jet printhead 12 and controls the multiplexor 56 through a multiplexor control signal 66. Furthermore, as will be described in further detail below, the stroke machine 63 generates the piezoelectric clock source 68 for driving the piezoelectric crystal 70 on the corresponding ink jet printhead 12.

Each digital decoder 36 derives an extracted digital clock signal 72 from the command/data stream transmitted by the raster printer controller 10 over the fiber optic data links 30, 32, 34a–c to the ring. The command/data stream is transmitted by the raster printer controller 10 over the fiber optic ring utilizing a self-clocking data transmission code as commonly known to one of ordinary skill in the art, such as the 8B/10B encoding algorithm as described in U.S. Pat. Nos. 4,486,739 and 4,665,517. The 8B/10B code is a block code which encodes 8-bit data blocks into 10-bit code words for serial transmission. The devices supporting this 8B/10B standard range in frequency from 125 MHz to 1.5 GHz (today), with future enhancements up to 2 to 4 GHz.

The message processing circuit 44 includes a message processing state machine 76, an address decrement device 78, a bi-directional command data buffer circuit 80 which couples the bi-directional data bus 61 to the output data bus 42 (or input data bus 38), and a bi-directional discrete data circuit 82 which couples the discrete input and output buffers 48, 46 to the output data bus 42 (or input data bus 38). The bidirectional command data buffer circuit 80 includes an output data register 84, fed by an output data buffer 86 which is controlled by the output data enable line 88 activated by the message processing state machine 76. Likewise, the bidirectional command buffer circuit 80 includes an input data register 90, for feeding an input data buffer 92 which is controlled by the input data enable line 94 activated by the message processing state machine 76. The bidirectional discrete data circuit 82 includes an output discrete data buffer 96, controlled by an output discrete data enable line 98, activated by the message processing state machine 76. Likewise, the bi-directional discrete data circuit 82 includes an input discrete data buffer 100, controlled by an input discrete data enable line 102 which is activated by the message processing state machine 76. The address decrement device 78 is controlled by a control line 104 activated by the message processing state machine 76.

The discrete output buffer 46, the discrete input buffer 48, the bitmap data memory storage buffer 52, and the other ink jet printhead interface components described above, controlled by the message processing state machine 76, in response to commands embedded in the command/data stream sent over the ring, provide an interface between the ink jet printheads 12 and the fiber optic ring. Furthermore, this design allows the raster printer controller 10 to utilize a multiplexed command/data protocol for communicating with the plurality of TABs 20a–20d, in which the raster printer controller transmits a command followed by a corresponding data-stream on the fiber optic ring.

The raster printer controller 10 initiates all commands and manages the allocation of fiber optic bandwidth to receive all ink jet printhead discretes and status. Each command contains an address field, and each TAB includes its own internal address. Thus, each TAB 20a–20d monitors the commands using their respective high-speed message processing circuits 44, and if addressed, the TABs respond appropriately. A TAB 20a–20d will never respond to a command unless that particular TAB is addressed by the command or unless the command is a "broadcast" command (i.e., a particular bit of the address field could be reserved for as a broadcast bit) intended to be processed by all of the TABs. Nevertheless, as discussed above, even if the particular TAB is not addressed by the command, its message processing circuit 44 will always retransmit that command and corresponding data-stream to the next TAB on the daisy-chain (or if the present TAB is the last TAB 20d on the daisy-chain, back to the raster printer controller). This allows all TABs 20a–20d to see all of the commands all of the time Referring to FIGS. 1 and 2, the encoder device 35 on the raster printer controller 10 embeds a digital clock signal derived from an internal clock source 73 into the encoded data transmitted on the ring. The digital decoding devices 36, utilized by each TAB, derive the extracted digital clock signal 72 from the encoded data received on the input port 26 utilizing an on-chip data tracking phase locked loop "PLL" as is known to one of ordinary skill in the art. Therefore, each extracted digital clock signal 72 on each of the TABs 20a–d, will have substantially the exact frequency, or a frequency that is exactly proportional to, the controller's internal clock source 73. Therefore, because this extracted digital clock signal 72 is used to create the piezoelectric clock source 66 as described in detail below; each piezoelectric clock source 66 on each TAB will have substantially the exact frequency, eliminating beat frequency drift errors between the pixel swaths.

In one embodiment, the encoder device 35, utilized by the raster printer controller 10, and the digital encoders 40, utilized by the TABs 20a–d, are CY7B923 HOTLink™ Transmitter devices available through Cypress Semiconductor Corp. (HOTLink is a trademark of Cypress Semiconductor Corp.). These devices convert the 8-bit raw digital data blocks into 10-bit code words which are subsequently transmitted on the ring. The decoder device 39, utilized by the raster printer controller 10, and the digital decoders 36, utilized by the TABs 20a–d, are CY7B933 HOTLink™ Receiver devices also available through Cypress Semiconductor Corporation. These devices receive the 10-bit coded data, and using a completely integrated PLL clock synchronizer, recover the timing information, in the form of the extracted digital clock signal 72, necessary for reconstructing the 8-bit raw digital data. The digital encoder 35 of the raster printer controller 10 utilizes the on-board clock source 73 as the byte rate reference clock "CKW" which is used by the encoder to create a bit rate clock embedded into the 10-bit coded data stream transmitted to the fiber optic ring. An on-board clock source 74 is used by the digital decoders 36 as a clock frequency reference ("REFCLK") for the clock/data synchronizing PLL which tracks the frequency of the incoming bit stream and aligns the phase of its internal bit rate clock to the serial data transmissions. The extracted digital clock signal output 72 is the byte rate clock output of the digital decoders 38, which is aligned in phase and frequency to the on-board clock source 73 of the raster printer controller. The operation and design of the HOTLink™ CY7B923/933 devices is described in detail in the HOTLink™ User's Guide (Copyright 1995, Cypress Semiconductor Corp.); and in particular, the CY7B923/933 Datasheet section (pp. 1–28) of the User's Guide, the disclosure of which is incorporated herein by reference.

Figure 3:
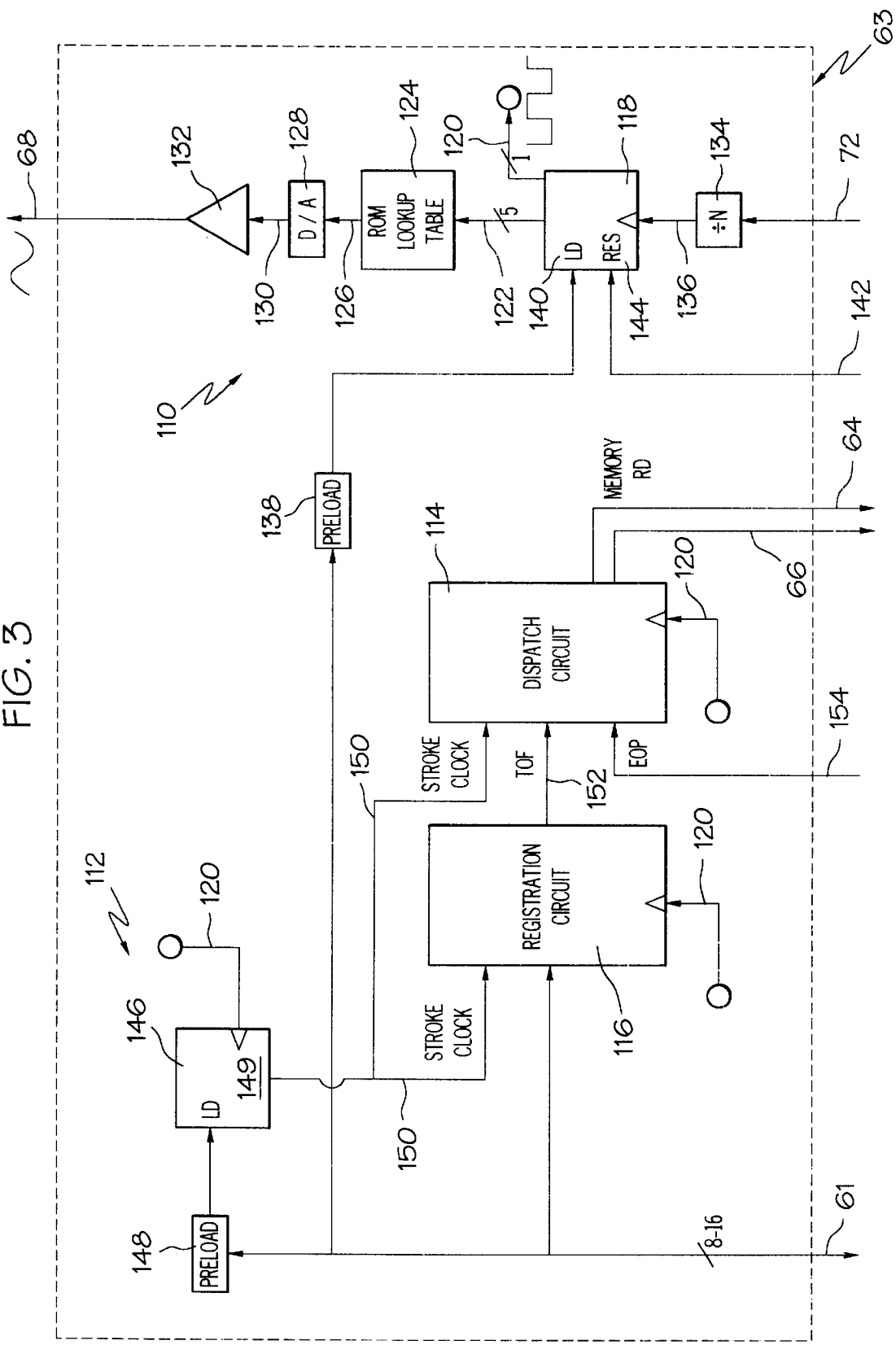
FIG. 3 is a schematic block diagram of a stroke machine circuit for use with the present invention.

As shown in FIG. 3, the stroke machine 63 includes a piezo clock generation circuit 110, a stroke frequency generation circuit 112, a dispatch control circuit 114, and a registration control circuit 116. The extracted digital clock signal 72, a 25 MHz signal in the present embodiment, is used by the piezo clock generation circuit to generate the piezoelectric clock source 68 for driving the piezoelectric crystal 70 on the corresponding ink jet printhead 12.

The extracted digital clock signal 72 drives a digital counter 118. The MSB 120 of the output count value is the digital piezo clock used by the stroke frequency generation circuit 112, the dispatch control circuit 114, and the registration control circuit 116. The digital piezo clock signal 120 will correspond directly to the piezoelectric cycles (frequency) of the piezoelectric crystal 70. The other bits 122 of the output count value are sent to a memory device 124 which operates as a lookup table. The lookup table includes a voltage amplitude value for every count value 122 received. These voltage amplitude values 126 are sent to a digital-to-analog converter 128 which converts the voltage amplitude values 126 to their corresponding analog voltages 130. To obtain the piezoelectric clock source 68, a voltage amplifier device 132 is used to amplify the analog voltages 130 to the voltage levels required for the piezoelectric clock source.

The voltage amplitude values 126 output by the memory device 124 are derived from the lookup table. The lookup table contains a particular voltage amplitude value 126 corresponding to a particular voltage amplitude level in one period of the piezoelectric clock source's sine wave. Thus, the memory device 124 will output the particular voltage amplitude value 126 from the lookup table, depending upon the count value 122 received from the counter 118. For example, if the count value is a five-bit value (0–31), as in the present embodiment, the lookup table will have thirty-two voltage amplitude values (for transmitting to the digital-to-analog converter 128) corresponding to thirty-two uniformly spaced-apart output voltages along a 5v peak-to-peak (the peak-to-peak voltage output from the digital-to-analog converter is selected depending upon the level of amplification desired to reach the 60V peak-to-peak piezo clock source signal) sinusoidal period as shown in the table below:

decrements the address field by one prior to retransmitting the command/data stream back to the ring. Thus, for example, if there are four TABs on the ring, and the raster printer controller intends to transmit a command to the fourth TAB on the ring, the address field of the command sent to the first TAB on the ring will equal three. The first TAB will not accept the command because the address field does not equal zero. The first TAB will subtract one from the address field, and it will then retransmit the command to the second TAB on the ring. The second TAB will not accept the command because the address field does not equal zero (address field now equals two). The second TAB will subtract one from the address field, and it will then retransmit the command to the third TAB on the ring. This is repeated for each TAB until the command finally reaches the fourth TAB on the ring. At this time, the address field equals zero, and therefore, the fourth TAB on the ring will accept and process the command. Because the fourth TAB does not know that it is the last TAB on the ring, it will also decrement the value of the address field prior to retransmitting the command back to the raster printer controller.

When the raster printer controller 10 boots up, it does not know the number of TABs 20a–20d on the ring. Accordingly, the raster printer controller will send an initialization command to the ring. The address field of this initialization command will be decremented by each of the

| Count Value (122) | Output Voltage (130) | Count Value (122) | Output Voltage (130) | Count Value (122) | Output Voltage (130) | Count Value (122) | Output Voltage (130) |
| --- | --- | --- | --- | --- | --- | --- | --- |
| 0 | 0.0V | 8 | 4.99V | 16 | −0.51V | 24 | −4.94V |
| 1 | 1.01V | 9 | 4.84V | 17 | −1.50V | 25 | −4.69V |
| 2 | 1.97V | 10 | 4.49V | 18 | −2.43V | 26 | −4.24V |
| 3 | 2.86V | 11 | 3.95V | 19 | −3.26V | 27 | −3.62V |
| 4 | 3.62V | 12 | 3.26V | 20 | −3.95V | 28 | −2.86V |
| 5 | 4.24V | 13 | 2.43V | 21 | −4.49V | 29 | −1.97V |
| 6 | 4.69V | 14 | 1.50V | 22 | −4.84V | 30 | −1.01V |
| 7 | 4.94V | 15 | 0.51V | 23 | −4.99V | 31 | 0.0V |

In the present embodiment, a frequency divider device 134 is inserted before the digital counter 118 to further reduce the frequency of the extracted digital clock signal 72 from 25 MHz to 3.2 MHz. Accordingly, the clock source 68 for the piezoelectric crystal 70 will have a frequency of 1/32 the frequency of the divided-down digital clock signal 136 (i.e., in the present embodiment, the clock source 68 will have a frequency of 100 KHz).

The extracted digital clock signal 72 is thus used by each TAB 20a–20d to generate the piezoelectric clock source 68 for driving the piezoelectric crystal 70 on its corresponding ink jet printhead 12a–12d. Therefore, because each extracted digital clock signal 72 on each of the TABs 20a–d will have substantially the exact frequency, as discussed above, beat frequency drift errors between the pixel swaths 16a–16d will be virtually eliminated.

The present invention also includes a system and method to eliminate any phase offset errors between all of the piezoelectric clock sources 68. As discussed above, the embedded command in the command/data stream transmitted on the ring by the raster printer controller 10 includes an address field, which specifies which TAB is to receive the command. However, in the preferred embodiment every TAB is set up with an identical predefined internal address of zero (address=0); and further, every TAB is configured to modify the address field of every command received by TABs on the ring; and thus, upon receiving the initialization command back from the ring, the raster printer controller will be able to determine the number of TABs on the ring and it will know how to address each of the TABs based upon the number of times the address field has been decremented prior to receiving the initialization command back from the ring.

The piezo clock generation circuit 110 includes a preload register 138 coupled to the load port 140 of the digital counter 118 and updatable by the raster printer controller 10 via commands transmitted on the ring. As shown in FIGS. 2 and 3, the state machine 76 for controlling the operations of the message processing circuit 44, includes a counter reset line 142, coupled to the reset port 144 of the digital counter 118. The preload register 138 stores a preload count which the digital counter 118 will start counting from upon being reset by the state machine 76.

During boot-up, the raster printer controller will send a PIEZO PHASE SYNC command to each TAB on the ring. This command will instruct the state machine 76 to fill the preload register 138 with the count value contained in the associated data sent with the PIEZO PHASE SYNC command. The count value loaded into the preload register 138 will correspond to the number of counts the digital counter 118 will count in the time required for a command to propagate from the first TAB 20a on the ring to the present TAB. Thus, in the present embodiment, the preload register 138 of the first TAB 20a will be set to 0; in the present embodiment, if the time required for a command to propagate from the first TAB 20a to the second TAB 20b on the ring is 1.25 micro-seconds, the preload register 138 for the second TAB will be set to 4 (which corresponds to the number of counts that the digital counter 118, counting at 3.2 MHz, will count in 1.25 micro-seconds); in the present embodiment, if the time required for a command to propagate from the first TAB 20a to the third TAB 20c on the ring is 2.50 micro-seconds, the preload register 138 for the second TAB will be set to 8 (which corresponds to the number of counts that the digital counter 118, counting at 3.2 MHz, will count in 2.50 micro-seconds); and, in the present embodiment, if the time required for a command to propagate from the first TAB 20a to the fourth TAB 20d on the ring is 3.75 micro-seconds, the preload register 138 for the second TAB will be set to 12 (which corresponds to the number of counts that the digital counter 118, counting at 3.2 MHz, will count in 3.75 micro-seconds).

Preferably, to allow for any number of ink jet printheads to be coupled to the ring at any one time, each fiber optic link between the TABs 20, will have the same length. Thus, the time it takes for a command to propagate from one TAB to the next will always be equal and deterministic; and the preload register 138 preload setting will be calculated by the raster printer controller 10 as directly proportional to the position that a particular TAB will have on the ring (i.e., whether a particular TAB is the first, second, third, etc. TAB on the ring).

To reset the digital counters 138 to their respective preload values, the raster printer controller will broadcast a PIEZO CLOCK RESET command to the ring. The PIEZO CLOCK RESET command will, of course first be received and executed by the message processing circuit 44 of the first TAB 20a on the ring. The state machine 76 of the first TAB's message processing circuit will, in response to the PIEZO CLOCK RESET command, will activate the counter reset line 142, which in turn resets the counter 118 to start counting at its corresponding preload value, read from its corresponding preload register 138. The first TAB will then pass the command to the next TAB 20b on the ring. Likewise, each successive TAB, upon receiving this command will reset its counter 118 to start counting at its corresponding preload value, read from its corresponding preload register 138; and the will then pass the command to the next TAB on the ring, until the command is eventually passed back to the raster printer controller 10. Because each preload register 138 on each TAB is set to an initial count value corresponding to the time it takes for the command to propagate to the respective TAB, the voltage levels 130 output from the digital-to-analog converter 128 on all the TABs will be equal at any given time. Thus, in addition to each piezoelectric clock source being locked in frequency as described above, each piezoelectric clock source will also be locked in phase.

As shown in FIG. 3, the stroke frequency generation circuit 112, includes a stroke clock counter 146 and a stroke rate preload register 148 updatable by the raster printer controller 10. The terminal count output 149 of the stroke clock counter 146 is the stroke clock signal 150 sent to the registration circuit 116 and the dispatch circuit 114. A typical stroke frequency is approximately 50 Khz. The 50 Khz stroke signal could be embedded into the command/data protocol and sent to each of the TABs; however, this would impair the bandwidth capabilities of the command/data protocol. Therefore, the raster printer controller will send a command within the command/data stream to each of the TABs on the ring at a 1 or 2 Khz rate indicative of the web velocity and/or acceleration. Based upon this velocity/acceleration data in the command, the microcontroller 58 will calculate a preload value to load into the stroke rate preload register 148 which is the accurate count of the number of piezo cycles between the dispatch of real bitmap data. The terminal count output 149 of the stroke clock counter 146 will activate every time the stroke clock counter 146 counts down from the preload value (stored in the preload register 148) to zero. All piezo cycles between the stroke periods get null data. Therefore, the stroke frequency generation circuit 112 provides an alternate approach to stroke clock generation when real-time shaft clock transmission over the fiber optic cable is not feasible.

The registration circuit 116, the design of which is practical knowledge to those of ordinary skill in the art, controls the issuance of the Top of Form signal 152 based upon the stroke clock signal 150 and the piezo cycle frequency signal 120. In generating the Top of Form signal 152, the registration circuit may also take into account clamp distance values and/or flight delay values as updated by the raster printer controller 10 using the command/data protocol scheme of the present invention.

The dispatch circuit 114, the design of which is practical knowledge to those of ordinary skill in the art, controls the issuance of the FIFO Memory Read signal 64 and the multiplexor control signal 66 (for injecting null data) based upon the stroke clock signal 150, the Top of Form signal 152, an End of Page signal 154 generated by the bitmap memory storage device 52, and the piezo cycle frequency signal 120. In generating the FIFO Memory Read signal 64, the dispatch circuit may take into account drops-per-dot values and/or stroke width values as updated by the raster printer controller 10 using the command/data protocol scheme of the present invention.

In conclusion, the present invention provides a high-speed printer controller system which is configured to control a multitude of ink jet printheads simultaneously, and which is configured to synchronize, in frequency as well as phase, all of the piezoelectric crystals located within the ink jet printheads. Further, while the system and method described herein constitutes the preferred embodiments of the present inventions, it is to be understood that the present inventions are not limited to their precise form, and that variations may be made without departing from the scope of the invention as set forth in the following claims,

What is claimed is:

1. A method for synchronizing a plurality of piezoelectric crystals on a corresponding plurality of ink jet printheads comprising the steps of:

providing a plurality of ink jet printheads, each of said printheads including an ink chamber having a plurality of nozzle orifices and a piezoelectric crystal for producing vibrational waves within said ink chamber, said piezoelectric crystal having a piezoelectric clock source and vibrating at a vibrational frequency of said piezoelectric clock source;

embedding a first clock signal in data so as to produce a combined data and clock signal;

communicating said combined data and clock signal to each of said printheads;

deriving said first clock signal from said combined data and clock signal by each of said printheads; and generating said piezoelectric clock source from said first clock signal by each of said printheads;

whereby said vibrational frequency of each of said plurality of piezoelectric crystals are generated from said first clock signal.

2. The method of claim 1, wherein said plurality of printheads are coupled together in a daisy-chain configuration to form a printhead daisy-chain and wherein said communicating step includes the steps of:

transmitting said combined data and clock signal to a first one of said printheads in said printhead daisy-chain; and receiving and retransmitting said combined data and clock signal to a next one of said printheads in said printhead daisy-chain by said printheads, until said combined data and clock signal is retransmitted to a last one of said printheads in said printhead daisy-chain.

3. The method of claim 2, wherein said piezoelectric clock source includes a phase and a frequency, and the method further comprises the step of:

adjusting said phase of said piezoelectric clock source, by said printheads, according to an amount of time for said combined data and clock signal to be received by said printheads.

4. The method of claim 3, wherein said printer controller is coupled to said last one of said printheads in said printhead daisy chain, and said communicating step includes the step of retransmitting said combined data and clock signal from said last printhead in said printhead daisy-chain to said printer controller.

5. The method of claim 4, wherein said plurality of printheads are coupled together with serial datalinks, said printer controller is coupled to said first printhead on said printhead daisy-chain with a serial datalink, said printer controller is coupled to said last printhead on said printhead daisy-chain with a serial datalink, and said transmitting and retransmitting steps are performed over said serial datalinks.

6. The method of claim 5, wherein said serial datalinks are fiber optic links.

7. The method of claim 6, wherein:

said combined data and clock signal is transmitted in said transmitting step using a self-clocking data transmission code; and said combined data and clock signal is transmitted in all of said retransmitting steps using said self-clocking data transmission code.

8. The method of claim 5, wherein said first clock signal is generated by a single clock source on said printer.

9. The method of claim 5, wherein:

said combined data and clock signal is transmitted in said transmitting step using a self-clocking data transmission code; and said combined data and clock signal is transmitted in all of said retransmitting steps using said self-clocking data transmission code.

10. The method of claim 2, wherein a printer controller is coupled to a first one of said printheads in said printhead daisy-chain and said printer controller performs said embedding and transmitting steps.

11. The method of claim 1, wherein said piezoelectric clock source includes a phase and a frequency, and the method further comprises the step of:

adjusting said phase of said piezoelectric clock source, by said printheads, according to an amount of time for said combined data and clock signal to be communicated to said printheads.

12. The method of claim 1, wherein said plurality of printheads are coupled to a printer controller in a star configuration, where said printer controller is at a hub of said star configuration and is coupled to each of said printheads with individual data links, and wherein said communicating step is performed over said individual data links.

13. The method of claim 1, wherein said generating step includes the steps of:

clocking a free running counter with said first clock signal, said counter having a count output;

translating said count output to a voltage amplitude level value corresponding to a respective point along a sinusoidal voltage signal period; and converting said voltage amplitude level value to an analog voltage, said analog voltage being said piezoelectric clock source.

14. The method of claim 13, further comprising the step of initializing said counters with a preload value, said preload value being defined according to an amount of time for said combined data and clock signal to be communicated to said printheads.

15. The method of claim 13, further comprising the step of amplifying said piezoelectric clock source.

16. A system for dispatching bitmap data to a plurality of printheads and for controlling said plurality of printheads, comprising:

a plurality of printheads;

a controller including a processing circuit for generating the bitmap data, an output port, and an input port;

a plurality of printhead communication circuits, each of said printhead communication circuits being operatively coupled to a corresponding one of said plurality of printheads, each of said communication circuits including an input port, an output port, a bitmap data transfer circuit, and a piezoelectric clock generation circuit for generating a piezoelectric clock source; and a plurality of data links coupling together said controller and said plurality of printhead communication circuits in a daisy-chain configuration;

each of said bitmap data transfer circuits being coupled to said corresponding one of said plurality of printheads to provide bitmap data to said corresponding one of said plurality of printheads, and each of said piezoelectric clock generation circuits being coupled to said corresponding one of said plurality of printheads to provide a piezoelectric clock source for said corresponding one of said plurality of printheads;

wherein said controller includes an encoder circuit, coupled to said output port of said controller, for encoding raw digital data and a first clock source into a data transmission code to be transmitted by said output port of said controller;

wherein each of said printhead communication circuits include a decoder circuit for decoding said data transmission code back into said raw digital data and into said first clock source, said decoder circuit having a data input coupled to said input port of said printhead communication circuit, a clock output coupled to said piezoelectric clock generation circuit for communicating said first clock source to said piezoelectric clock generation circuit, and a data output coupled to said bitmap data transfer circuit for communicating at least a portion of said raw digital data to said bitmap data transfer circuit; and wherein said piezoelectric clock source is generated from said first clock source by said piezoelectric clock generation circuit.

17. The system of claim 16, wherein said plurality of data links are serial data links.

18. The system of claim 17, wherein said serial data links are fiber optic data links.

19. The system of claim 18, wherein each of said printhead communication circuits includes a message processing circuit coupled to said data output of said decoder circuit, said message processing circuit including means for monitoring said raw data and executing commands embedded in said raw data.

20. The system of claim 19, wherein each of said printhead communication circuits includes an encoder circuit coupled to said message processing circuit and coupled to said output port of said printhead communication circuit, wherein said message processing circuit further includes means for sending said raw data to said encoder circuit of said printhead communication circuit which re-encodes said raw data into re-encoded data and which then sends said re-encoded data to said output port of said printhead communication circuit such that said re-encoded data is re-transmitted by said printhead communication circuit.

21. The system of claim 19, wherein each of said printhead communication circuits includes at least one input discrete line coupled to said corresponding one of said plurality of printheads and at least one output discrete line coupled to said corresponding one of said plurality of printheads, and said message processing circuit further includes means for transmitting a signal on said output discrete line and means for polling a signal on said input discrete line responsive to one of said commands.

22. The system of claim 16, wherein each of said piezoelectric clock generation circuits include:
a counter for generating a plurality of count values, having a clock input coupled to said clock output of said decoder circuit and a count value output;
a memory circuit having an internal look-up table, a count value input coupled to said count value output of said counter, and a voltage amplitude value output, said look-up table having a corresponding voltage amplitude value for each of said count values, and said memory circuit setting said voltage amplitude value output by consulting said look-up table for a voltage amplitude value corresponding to a count value received on said count value input; and
a digital-to-analog converter having a digital input coupled to said voltage amplitude value output of said memory circuit and a piezoelectric clock source output.

23. The system of claim 22, wherein each of said piezoelectric clock generation circuits includes a frequency divider device coupled between said clock input of said counter and said clock output of said decoder circuit.

24. The system of claim 23, wherein each of said piezoelectric clock generation circuits include a voltage amplifier coupled between said piezoelectric clock source of said digital-to-analog converter and said corresponding one of said plurality of printheads.

25. The system of claim 22, wherein
each of said piezoelectric clock generation circuits includes a preload register coupled to a preload input of said counter;
each of said printhead communication circuits includes a message processing circuit coupled to said data output of said decoder circuit, said message processing circuit including means for monitoring said raw data and for executing commands embedded in said raw data; and
said message processing circuit further including means for updating said preload register as directed by one of said commands.

26. The system of claim 22, wherein
each of said printhead communication circuits includes a dispatch circuit and a registration circuit;
sad counter includes a digital clock output corresponding to a most significant bit of said count value output; and
said digital clock output is coupled to a clock input of said dispatch circuit and a clock input of said registration circuit.

27. A high-speed ink jet printing system comprising:
a plurality of ink-jet printheads;
a controller including a processing circuit for generating bitmap data, an output port, and an input port;
a plurality of printhead communication circuits, each of said communication circuits being operatively coupled to a corresponding one of said plurality of ink-jet printheads, each of said communication circuits including an input port, an output port, a bitmap data transfer circuit, and a piezoelectric clock generation circuit for generating a piezoelectric clock source for its said corresponding one of said ink-jet printheads; and
a plurality of data links operatively coupling said printhead communication circuits to said controller;
wherein each of said bitmap data transfer circuits is coupled to said corresponding one of said plurality of ink-jet printheads to provide said bitmap data to said corresponding one of said plurality of ink-jet printheads, and each of said piezoelectric clock generation circuits is coupled to its said corresponding one of said ink-jet printheads to provide a piezoelectric clock source for said corresponding one of said plurality of ink-jet printheads;
wherein said controller includes an encoder circuit, coupled to said output port of said controller, for encoding raw digital data and a first clock source into a data transmission code to be transmitted by said output port of said controller;
wherein each of said printhead communication circuits includes a decoder circuit for decoding said data transmission code back into said raw digital data and into said first clock source, said decoder circuit having a data input coupled to said input port of said printhead communication circuit, a clock output coupled to said piezoelectric clock generation circuit for communication said first clock source to said piezoelectric clock generation circuit, and a data output coupled to said bitmap data transfer circuit for communicating at least a portion of said raw digital data to said bitmap data transfer circuit; and
wherein each of said piezoelectric clock generation circuits generate said piezoelectric clock source for said corresponding one of said plurality of ink-jet printheads from said first clock source.

28. The system of claim 27, wherein said data links operatively couple said plurality of printhead communication circuits to said controller in a daisy-chain configuration.

29. The system of claim 27, wherein said data links operatively couple said plurality of printhead communication circuits to said controller in a star configuration, and wherein said controller is at a hub of said star configuration.

30. An ink-jet printing system, comprising:
an ink-jet printhead including an ink chamber and a piezoelectric crystal operatively coupled to the ink chamber to produce vibrational waves in said ink chamber;

a controller including a processing circuit for generating bitmap data, an output port, and an encoder, operatively coupled between said output port and said processing circuit, for combining a clock signal with said bitmap data so as to produce a combined data and clock signal;

a printhead communication circuit, operatively coupled to said ink-jet printhead; and a data link operatively coupling said output port of said controller to an input port of said printhead communication circuit;

said printhead communication circuit further including,
  a decoder operatively coupled to said input port for extracting said bitmap data and said clock signal from said combined data and clock signal received by said input port, a bitmap data transfer circuit operatively coupled between said decoder and said ink-jet printhead to provide said bitmap data to said ink-jet printhead, and a piezoelectric clock generation circuit operatively coupled between said decoder and said ink-jet printhead for generating a piezoelectric clock source from said clock signal for said piezoelectric crystal of said ink-jet printhead.

\* \* \* \* \*